(12) United States Patent
Aso

(10) Patent No.: US 9,863,376 B2
(45) Date of Patent: Jan. 9, 2018

(54) CANISTER STRUCTURE

(71) Applicant: TOYOTA JIDOSHA KABUSHIKI KAISHA, Toyota-shi, Aichi-ken (JP)

(72) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/217,335

(22) Filed: Jul. 22, 2016

(65) Prior Publication Data

US 2017/0051705 A1 Feb. 23, 2017

(30) Foreign Application Priority Data

Aug. 18, 2015 (JP) ................................. 2015-161185

(51) Int. Cl.
| | |
|---|---|
| *F02M 33/02* | (2006.01) |
| *F02M 25/08* | (2006.01) |
| *B60K 15/035* | (2006.01) |
| *B01D 53/04* | (2006.01) |

(Continued)

(52) U.S. Cl.
CPC ......... *F02M 25/0854* (2013.01); *B01D 53/04* (2013.01); *B60K 15/035* (2013.01); *B60K 15/03504* (2013.01); *F02M 25/08* (2013.01); *F02M 25/089* (2013.01); *F02M 25/0872* (2013.01); *F02M 37/0082* (2013.01); *F02M 59/44* (2013.01); *B60K 2015/03514* (2013.01); *F02M 2025/0881* (2013.01)

(58) Field of Classification Search
CPC ........... F02M 25/0854; F02M 25/0872; F02M 25/089; F02M 25/08; F02M 59/44; F02M 37/0082; F02M 2025/0081; B01D 53/04; B60K 15/035; B60K 15/03504; B60K 2015/03514

USPC ......................................... 123/516, 518, 519
See application file for complete search history.

(56) References Cited

U.S. PATENT DOCUMENTS

| | | | | |
|---|---|---|---|---|
| 7,347,191 | B2* | 3/2008 | Atwood | ............... B60K 15/035 |
| | | | | 123/516 |
| 9,458,802 | B2* | 10/2016 | Dudar | ................ F02M 25/0854 |
| 9,518,677 | B2* | 12/2016 | Dudar | ................ F02M 25/0818 |

(Continued)

FOREIGN PATENT DOCUMENTS

| | | |
|---|---|---|
| JP | S55-119419 A | 9/1980 |
| JP | 2002-122053 A | 4/2002 |

(Continued)

OTHER PUBLICATIONS

Oct. 24, 2017 Office Action issued in Japanese Patent Application No. 2015-161185.

*Primary Examiner* — Hai Huynh
(74) *Attorney, Agent, or Firm* — Oliff PLC

(57) ABSTRACT

A canister structure comprising: a canister 28 in which activated carbon 44 is accommodated, the activated carbon 44 being for adsorbing evaporated fuel produced in a fuel tank; an atmosphere vent tube 30 connected to the canister 28, the atmosphere vent tube 30 introducing air into the canister 28 and causing evaporated fuel adsorbed by the activated carbon 44 to be desorbed when a negative pressure acts in the canister 28; and a fuel pump controller 46 disposed in the canister 28, the fuel pump controller 46 controlling flow rates of fuel being supplied from the fuel tank to an engine, and the fuel pump controller 46 generating heat due to being operated.

8 Claims, 11 Drawing Sheets

(51) Int. Cl.
*F02M 37/00* (2006.01)
*F02M 59/44* (2006.01)

(56) References Cited

U.S. PATENT DOCUMENTS

| | | | |
|---|---|---|---|
| 2007/0012298 A1 | 1/2007 | Nakamura et al. | |
| 2012/0260893 A1 | 10/2012 | Makino | |
| 2015/0226630 A1* | 8/2015 | Nakagawa | F02M 25/0818 73/40.7 |

FOREIGN PATENT DOCUMENTS

| | | |
|---|---|---|
| JP | 2007-023786 A | 2/2007 |
| JP | 2009-004574 A | 1/2009 |
| JP | 2010-163883 A | 7/2010 |
| JP | 2012-225167 A | 11/2012 |

* cited by examiner

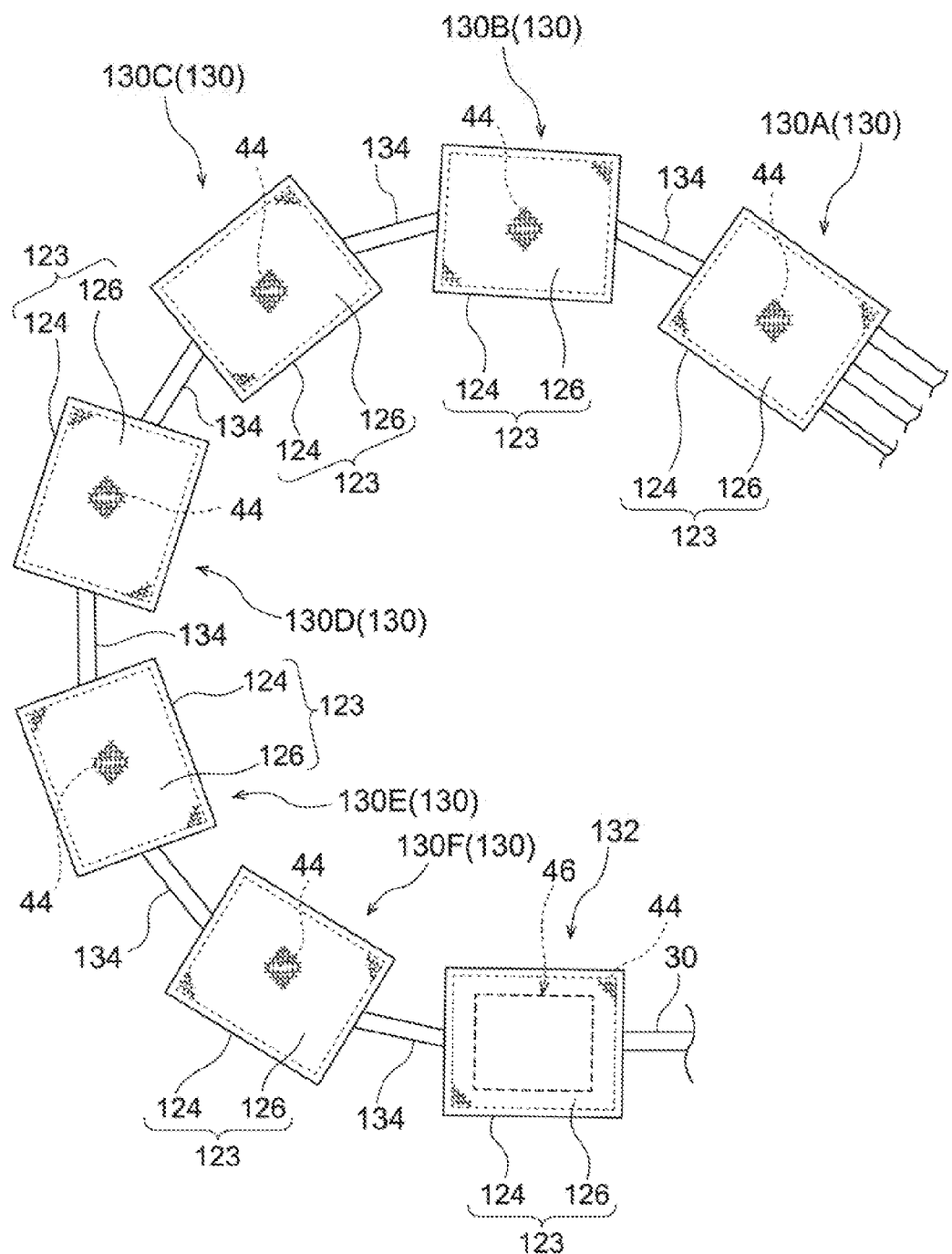

CANISTER STRUCTURE

CROSS-REFERENCE TO RELATED APPLICATION

This application claims priority under 35 USC 119 from Japanese Patent Application No. 2015-161185 filed Aug. 18, 2015, the disclosure of which is incorporated by reference herein in its entirety.

BACKGROUND

Technical Field

The present invention relates to a canister structure.

Related Art

Japanese Patent Application Laid-Open (JP-A) No. 2010-163883 discloses a canister structure that is provided with a canister for adsorbing evaporated fuel (vapor) produced in a fuel tank. In this structure, a Peltier device is disposed in a casing, and activated carbon is packed into a region that goes to a high temperature when the Peltier device is driven. A technique is recited in which, in a state in which evaporated fuel has been adsorbed by the activated carbon, the activated carbon is heated by the Peltier device being driven, which promotes desorption (purging) of the evaporated fuel.

SUMMARY

However, in the canister structure disclosed in the document mentioned above, extra energy (electric power) is needed for driving the Peltier device. Therefore, there is scope for improvement in regard to improving fuel efficiency.

In consideration of the circumstances described above, an object of the present invention is to provide a canister structure that may promote the desorption of evaporated fuel without needing extra energy.

SOLUTION TO PROBLEM

The canister structure according to a first aspect includes: a canister in which activated carbon is accommodated, the activated carbon being for adsorbing evaporated fuel produced in a fuel tank; an atmosphere vent tube connected to the canister, the atmosphere vent tube introducing air into the canister and causing evaporated fuel adsorbed by the activated carbon to be desorbed when a negative pressure acts in the canister; and a fuel pump controller disposed in the canister, the fuel pump controller controlling flow rates of fuel being supplied from the fuel tank to an engine, and the fuel pump controller generating heat due to being operated.

In the canister structure of the first aspect, the activated carbon for adsorbing evaporated fuel is accommodated in the canister. The atmosphere vent tube is connected to the canister. Air is introduced into the canister through the atmosphere vent tube when a negative pressure acts in the canister. Hence, evaporated fuel that has been adsorbed by the activated carbon is desorbed. The fuel pump controller for controlling flow rates of fuel being fed from the fuel tank to the engine is disposed inside the canister. When fuel in the fuel tank is being fed to the engine, the fuel pump controller is driven, generating heat. Consequently, the activated carbon is heated by the heat generated by the fuel pump controller, and the desorption of evaporated fuel is promoted. Thus, heat produced from the fuel pump controller for controlling flow rates of fuel may be utilized to heat the activated carbon. That is, the desorption of evaporated fuel may be promoted without using extra energy.

In the canister structure according to a second aspect, in the first aspect, dividing walls having thermal conductivity are plurally arranged in the canister, and the activated carbon is packed in between neighboring dividing walls.

In the canister structure of the second aspect, the activated carbon is packed in between the plural dividing walls featuring thermal conductivity. Therefore, heat from the fuel pump controller may be conducted through the plural dividing walls to the activated carbon, and the activated carbon may be heated efficiently. The meaning of the term "featuring thermal conductivity" as used herein broadly includes materials with higher thermal conductivity than materials with low thermal conductivity such as air and water, including metals in general and thermally conductive resins.

In the canister structure according to a third aspect, in the second aspect, the fuel pump controller comprises a circuit board and an accommodation portion, the accommodation portion accommodating the circuit board and having thermal conductivity, and wherein the accommodation portion is in contact with at least a portion of the dividing walls.

In the canister structure of the third aspect, because the accommodation portion of the fuel pump controller touches at least a portion of the dividing walls, heat produced by the fuel pump controller is conducted through the accommodation portion to the dividing walls efficiently.

In the canister structure according to a fourth aspect, in any one of the first to third aspects, at least a portion of a canister case that structures an outer shell of the canister is formed of a material having thermal conductivity.

In the canister structure of the fourth aspect, heat that is released when evaporated fuel is being adsorbed by the activated carbon is emitted to the outside of the canister through the canister case, Therefore, a rise in temperature of the activated carbon when evaporated fuel is being adsorbed by the activated carbon during fuelling or the like may be moderated, and an increase in resistance to the adsorption of evaporated fuel by the activated carbon may be suppressed.

In the canister structure according to a fifth aspect, in the fourth aspect, the canister case includes a case main body and an upper lid, and the upper lid is formed of the material having thermal conductivity.

In the canister structure of the fifth aspect, heat inside the canister case may be emitted outside the canister case through the upper lid, via the dividing walls. Thus, a rise in temperature of the activated carbon when the engine is stopped or the like may be moderated.

In the canister structure according to a sixth aspect, in any one of the first to fifth aspects, the fuel pump controller is disposed in a vicinity of the atmosphere vent tube.

In the canister structure of the sixth aspect, the temperature of the activated carbon is raised in the vicinity of the atmosphere vent tube. Therefore, discharges of evaporated fuel to the atmosphere may be suppressed compared to a structure in which the fuel pump controller is disposed at an alternative location.

In the canister structure according to a seventh aspect, in any one of the first to sixth aspects, the canister is disposed in the fuel tank.

In the canister structure of the seventh aspect, because the canister is disposed in the fuel tank, space for fixing the canister to a vehicle body is not required. Thus, space may be saved.

In the canister structure according to an eighth aspect, in the first aspect, a plurality of canisters are connected in series by a connecting tube, and the fuel pump controller is accommodated inside a canister among the plural canisters, to which canister the atmosphere vent tube is directly connected.

In the canister structure of the eighth aspect, a flow path of the evaporated fuel is lengthened by the plural canisters being connected in series. As a result, discharges of evaporated fuel into the atmosphere may be suppressed. Furthermore, because the fuel pump controller is accommodated inside the canister to which the atmosphere vent tube is directly connected, desorption of evaporated fuel from the activated carbon in this canister may be promoted and flows of evaporated fuel into the atmosphere vent tube may be suppressed.

ADVANTAGEOUS EFFECTS OF INVENTION

As described above, according to the canister structure of the first aspect, an excellent effect is provided in that desorption of evaporated fuel may be promoted without extra energy being required.

According to the canister structures of the second aspect and the third aspect, an excellent effect is provided in that desorption performance when evaporated fuel is being desorbed from the activated carbon may be improved.

According to the canister structure of the fourth aspect, an excellent, effect is provided in that adsorption performance when evaporated fuel is being adsorbed by the activated carbon may be excellently maintained.

BRIEF DESCRIPTION OF THE DRAWINGS

Preferred embodiments will be described in detail based on the following figures, wherein:

FIG. 4 is a sectional diagram showing a state in which FIG. 3 is cut along line 4-4.

FIG. 11 is a magnified plan view, corresponding to FIG. 3, in which principal portions of a canister structure in accordance with a sixth exemplary embodiment are shown magnified.

DETAILED DESCRIPTION

First Exemplary Embodiment

Figure 1:
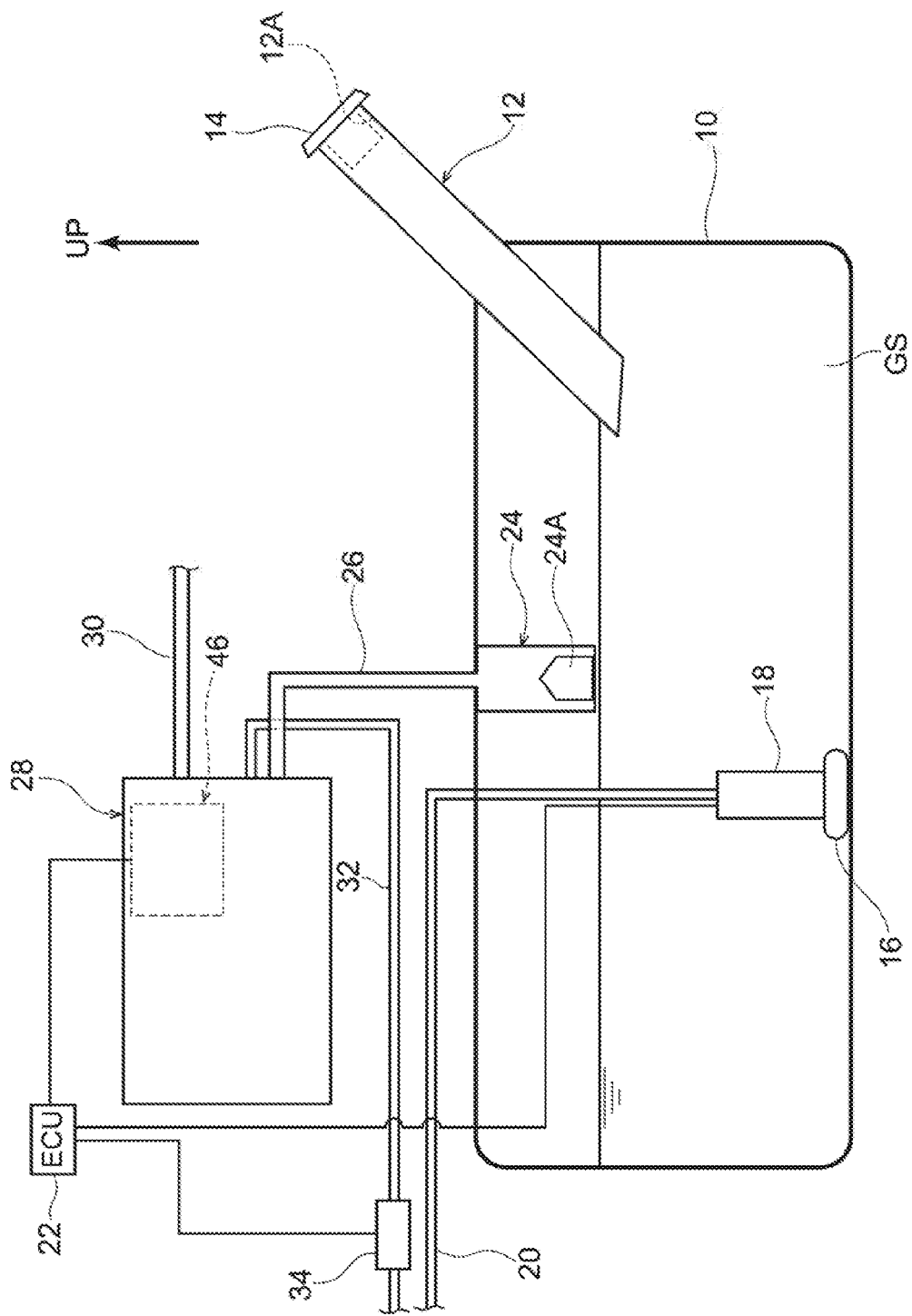
FIG. 1 is a schematic diagram schematically showing structures of a fuel tank in which a canister structure in accordance with a first exemplary embodiment is employed.

Below, a canister structure according to a first exemplary embodiment is described. The arrow UP that is shown as appropriate in the drawings indicates an upper side of a fuel tank. In the present exemplary embodiment, the upper side of the fuel tank coincides with the upper side of a vehicle up-and-down direction.

Overall Structure

As shown in FIG. 1, a fuel tank 10 of a vehicle in which the canister structure according to the present exemplary embodiment is employed is formed in a hollow shape, and a liquid fuel (below referred to as "the fuel GS") is accommodated in the interior of the fuel tank 10. A lower face of the fuel tank 10 is supported by a tank band, which is not shown in the drawings. The tank band is fixed to a floor panel, which is not shown in the drawings, via brackets or the like. Thus, the fuel tank 10 is mounted at the floor panel.

A filler pipe 12 in a substantially tubular shape is connected to the fuel tank 10. A fuelling opening 12A is formed at an upper end portion of the filler pipe 12. Fuelling is implemented by a nozzle of a fuelling gun being inserted into the fuelling opening 12A and the fuel GS flowing into the fuel tank 10.

The fuelling opening 12A at the upper end of the filler pipe 12 is opened and closed by a fuel cap 14. A fuel lid, which is not shown in the drawings, is disposed at the outer side of the fuel cap 14. The fuel lid is provided at a side panel of the vehicle body or the like.

A liquid surface sensor, which is not shown in the drawings, is provided inside the filler pipe 12. The liquid surface sensor is a sensor that senses a liquid surface of the fuel GS accommodated in the fuel tank 10. The liquid surface sensor is constituted by an electrostatic capacitance sensor or the like. Amounts of the fuel GS in the fuel tank 10 may be detected using alternative sensors.

A filter 16 for removing impurities in the fuel GS is provided at a floor portion inside the fuel tank 10. A fuel pump 18 is disposed at an upper face of the filter 16. The fuel pump 18 is an apparatus for feeding the fuel GS to an engine, which is an internal combustion engine that is not shown in the drawings. A feeding pipe 20 extends from the fuel pump 18 to the engine. Accordingly, when the fuel pump 18 operates, the fuel GS in the fuel tank 10 is fed through the filter 16 to the fuel pump 18, and is fed to the engine by the fuel pump 18.

The fuel pump 18 according to the present exemplary embodiment is electrically connected to an electronic control unit (ECU) 22, which is described below.

Vent piping 26 is connected to a roof portion of the fuel tank 10. A float valve 24 is provided at a connection portion between the vent piping 26 and the fuel tank 10. The float valve 24 is provided with a float valve body 24A. If the fuel GS reaches the float valve 24, the float valve body 24A floats up and closes off a flow path of the vein piping 26, inhibiting a flow of the fuel GS into the vent piping 26.

The vent piping 26 is connected to a canister 28, and an atmosphere vent tube 30 is connected to the canister 28. The canister 28 is in fluid communication with the atmosphere via the atmosphere vent tube 30. Purge piping 32 is connected to the canister 28 and is connected to the engine. A purge control valve 34 is provided on the purge piping 32, forming a structure such that flow rates of evaporated fuel flowing through the purge piping 32 may be regulated. The purge control valve 34 too is electrically connected to the ECU 72.

Structure of the Canister 28

Figure 2:
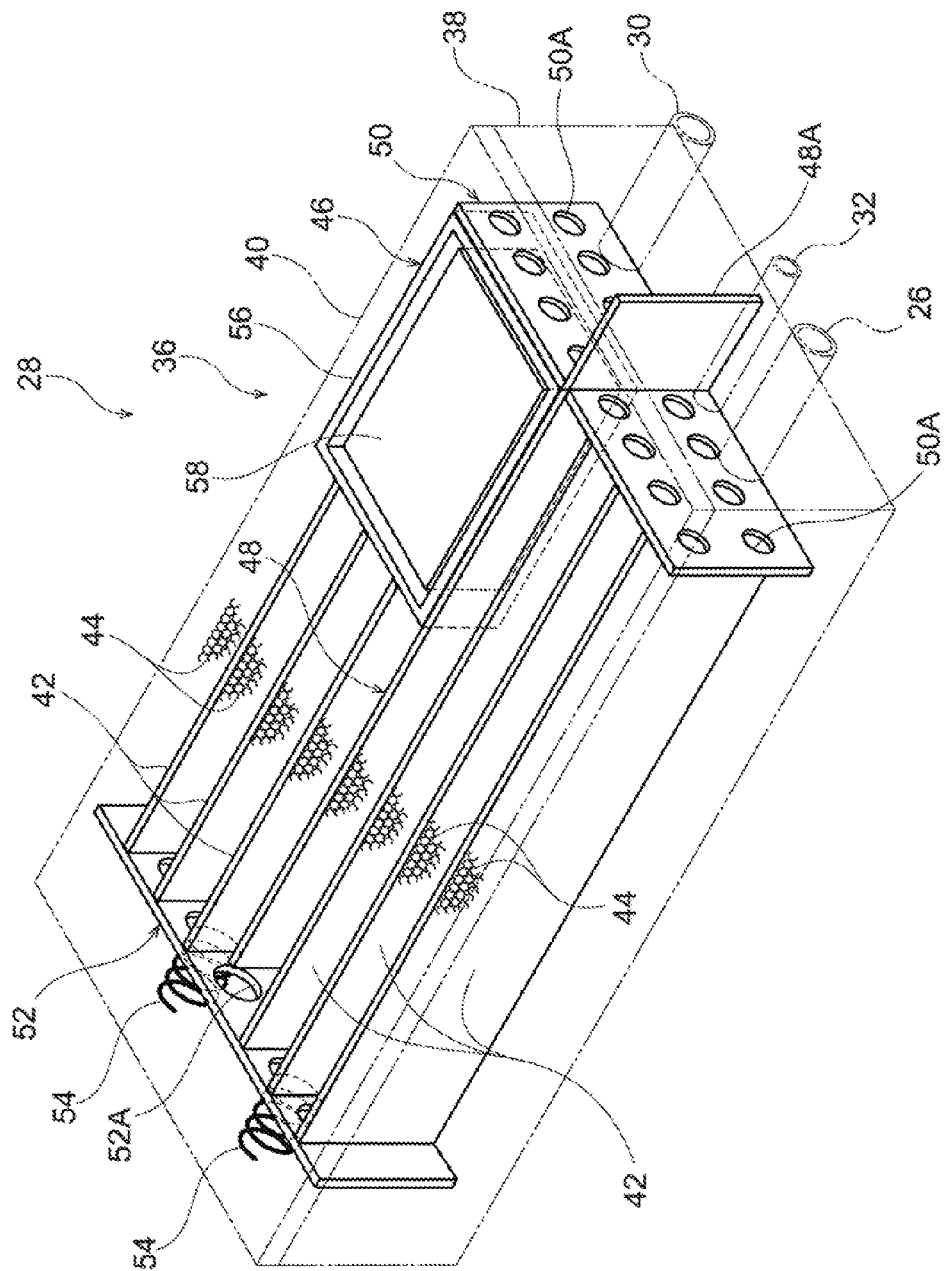
FIG. 2 is a magnified perspective diagram in which principal portions of the canister structure in accordance with the first exemplary embodiment are shown magnified.

Below, details of the canister 28 are described in accordance with FIG. 2 to FIG. 4. As shown in FIG. 2, the canister 28 according to the present exemplary embodiment is provided with a canister case 36 that structures an outer shell thereof. The canister case 36 includes a case main body 38 and an upper lid 40. The up-and-down direction of FIG. 3 (a short dimension direction of the canister case 36 in plan view) corresponds to a case width direction, and the left-and-right direction of FIG. 3 (a long dimension direction of the canister case 36 in plan view) corresponds to a case length direction. The up-and-down direction of FIG. 4 corresponds to the case up-and-down direction.

Figure 3:
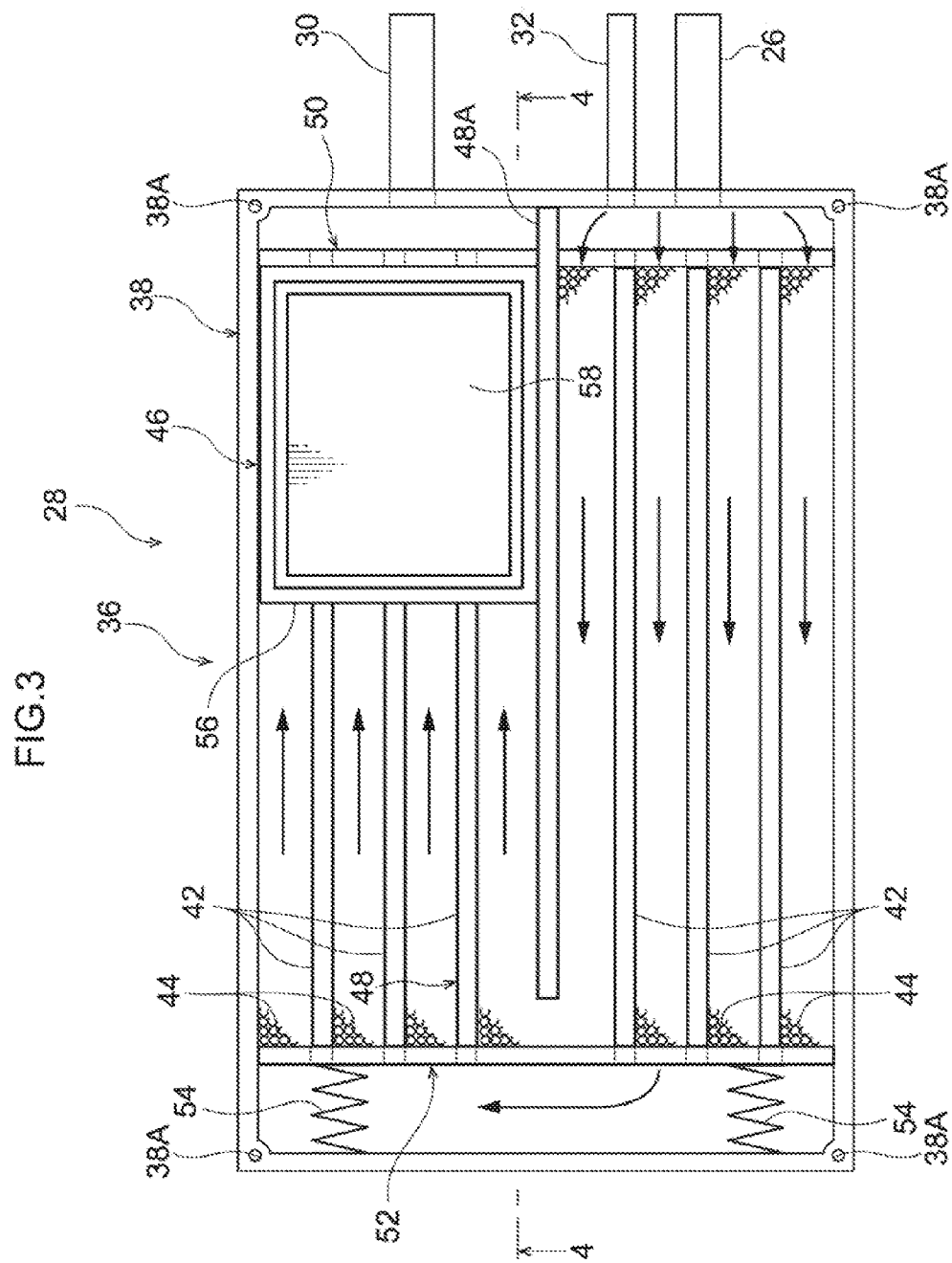
FIG. 3 is a magnified plan view of the canister structure of FIG. 2 seen from a vehicle upper face, showing a state in which an upper lid is removed.

As shown in FIG. 3, viewed from above in the case up-and-down direction, the case main body 38 is formed in a substantially rectangular box shape. The upper face of the case main body 38 in the case up-and-down direction is open. The vent piping 26, the atmosphere vent tube 30 and the purge piping 32 are connected to one end portion of the case length direction of the case main body 38. Bolt holes 38A are formed in respective upper end portions of the four corners of the case main body 38.

As shown in FIG. 2, the upper lid 40 is attached to the case main body 38 and the upper face of the case main body 38 is closed off by the upper lid 40. Insertion holes for the insertion of bolts or the like, which are not shown in the drawings, are formed at the four corners of the upper lid 40. The upper lid 40 is fastened to the case main body 38 by the bolts or the like being inserted into the insertion holes and screwed into the bolt holes 38A of the case main body 38.

In order to reduce weight, the case main body 38 according to the present exemplary embodiment is formed of a resin. In contrast, the upper lid 40 is formed of a material featuring thermal conductivity, being formed of, for example, aluminium or an aluminium alloy. In other words, a portion of the canister case 36 is formed of a material featuring thermal conductivity.

Figure 4:
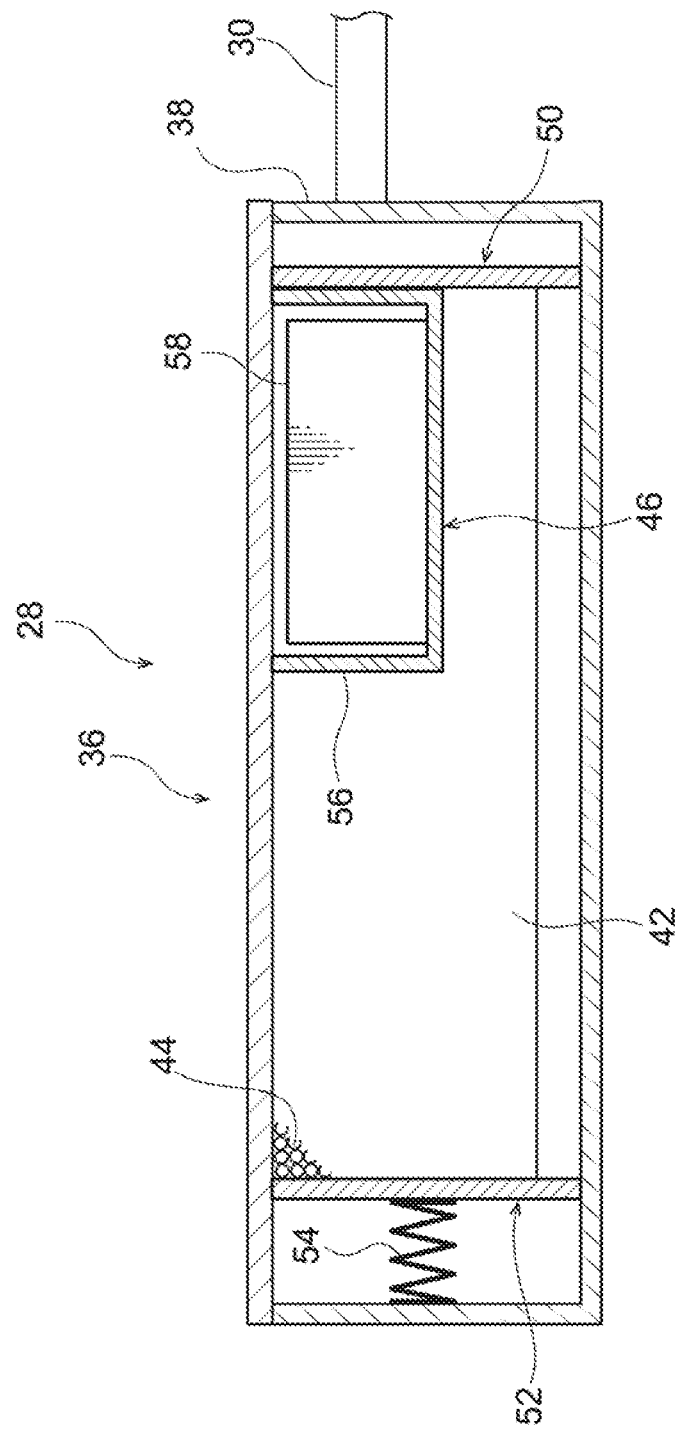

As shown in FIG. 2 to FIG. 4, the interior of the canister case 36 accommodates plural dividing walls 42, a dividing wall 48, activated carbon 44 for adsorbing evaporated fuel, and a fuel pump controller 46.

Each dividing wall 42 is arranged along the case length direction with a wall thickness direction thereof in the case width direction. The dividing walls 42 are plurally arranged, with three of the dividing walls 42 being disposed at one side in the case width direction, spaced apart in the case width direction. Three more of the dividing walls 42 are disposed at the other side in the case width direction, spaced apart in the case width direction. The dividing wall 48 is disposed at a middle portion in the case width direction. Upper end portions of the dividing walls 42 and an upper end portion of the dividing wall 48 are in contact with the upper lid 40. In this structure, the dividing walls 42 and the dividing wall 48 are formed of a material featuring thermal conductivity, being formed of, for example, aluminium or an aluminium alloy.

A support plate 50 is provided inside the canister case 36 at one end portion of the case length direction, and a support plate 52 is provided at the other end portion of the case length direction. The plural dividing walls 42 span between the support plate 50 and the support plate 52. The activated carbon 44 is packed in between neighboring the dividing walls 42. For convenience of depiction, only portions of the activated carbon 44 are shown in the drawings.

The support plate 50 is arranged along the case width direction at the one end portion of the case length direction at which the vent piping 26 and the like are connected. Plural penetrating holes 50A are formed in the support plate 50. Evaporated fuel that is introduced into the canister case 36 through the vent piping 26 may now through the penetrating holes 50A into the space between the support plate 50 and the support plate 52.

Meanwhile, the support plate 52 is arranged along the case width direction at the other end side of the case length direction, and plural penetrating holes 52A are formed in the support plate 52. Two compression coil springs 54 are attached to the support plate 52. Each of the compression coil springs 54 connects the support plate 52 with an interior wall of the case main body 38 in the case length direction. Consequently, the support plate 52 is urged by the compression coil springs 54 toward the side at which the support plate 50 is disposed. Thus, jostling of the activated carbon 44 packed between the dividing walls 42 is suppressed.

The dividing wall 48 that is disposed in the middle portion of the case width direction extends further to the one end portion of the case length direction than the dividing walls 42. One end portion 48A of the dividing wall 48 protrudes to the one end side in the case length direction relative to the support plate 50 and is joined to an interior wall of the case main body 38. Therefore, as shown in FIG. 3, a space in the base main body 38 between the support plate 50 and the case main body 38 is divided by the dividing wall 48 into a space that is in fluid communication with the vent piping 26 and the purge piping 32 (the space at the lower side of FIG. 3) and a space that is in fluid communication with the atmosphere vent tube 30 (the space at the upper side of FIG. 3).

Because the space inside the canister case 36 is divided up in the manner described above, when evaporated fuel is introduced through the vent piping 26 into the canister 28 during, for example, fuelling of the fuel GS or the like, the evaporated fuel flows toward the support plate 52 along flow paths at the lower side of FIG. 3, which are divided by the dividing walls 42 and the dividing wall 48, as indicated by the arrows in FIG. 3. During this flow, a portion of the evaporated fuel is adsorbed by the activated carbon 44. Evaporated fuel that reaches the support plate 52 flows through the space between the support plate 52 and the interior wall of the case main body 38, and flows towards the support plate 50 along flow paths at the upper side of FIG. 3. During this flow, the remaining evaporated fuel is adsorbed by the activated carbon 44. Air components from which the evaporated fuel has been removed are vented through the atmosphere vent tube 30 to the atmosphere.

At another time, when a negative pressure from the engine acts in the canister 28 via the purge piping 32, air is introduced through the atmosphere vent tube 30 into the canister 28. The air flows in the opposite direction to the arrows in FIG. 3, and the evaporated fuel that has been adsorbed by the activated carbon 44 is desorbed (purged). The evaporated fuel that is desorbed thus is fed through the purge piping 32 to the engine.

The fuel pump controller 46 is disposed inside the canister case 36, in a vicinity of the atmosphere vent tube 30. The fuel pump controller 46 is a unit for controlling flow rates of the fuel GS being fed from the fuel tank 10 to the engine. The fuel pump controller 46 includes a Fuel Pump controller (FPC) case 56, which serves as an accommodation portion, and a circuit hoard 58.

Viewed from above in the case up-and-down direction, the FPC case 56 is formed in a substantially rectangular box shape. The upper face of the FPC case 56 in the case up-and-down direction is open. The circuit board 58 is accommodated in the FPC case 56.

In this structure, the FPC case 56 is formed of a material featuring thermal conductivity, being formed of, for example, aluminium or an aluminium alloy. As shown in FIG. 4, the FPC case 56 is attached to a lower face of the upper lid 40. Thus, the upper face of the FPC case 56 is closed off by the upper lid 40. Various methods may be employed as a method for attaching the FPC case 56. For example, flanges may be formed at upper end portions of the FPC case 56 and the flanges may be fastened to the upper lid 40 by fasteners such as bolts or the like.

As shown in FIG. 2 and FIG. 3, side faces and a lower face of the FPC case 56 are in contact with the dividing walls 42 that are in the vicinity of the FPC case 56 and the dividing wall 48. The circuit board 58 accommodated in the FPC case 56 is electrically connected to the ECU 22 (see FIG. 1). When the circuit board 58 is driven in accordance with signals from the ECU 22, the circuit board 58 generates heat.

As shown in FIG. 1, the ECU 22 is electrically connected to the fuel pump 18, the purge control valve 34, and the circuit board 58 of the fuel pump controller 46. The ECU 22 controls flow rates of the fuel GS to be fed to the engine in accordance with rotation speeds of the engine and suchlike. To be specific, when the rotation speed of the engine is low and little of the fuel GS is needed, the ECU 22 sends signals to the fuel pump 18 to reduce the flow rate of the fuel GS being fed to the engine. In contrast, when large amounts of the fuel GS are needed, the ECU 22 sends signals to the fuel pump 18 to increase the flow rate of the fuel GS being fed to the engine. At these times, the fuel GS is fed by, for example, the circuit board 58 of the fuel pump controller 46 being driven to switch levels of electric current in a stator coil of the fuel pump 18.

Operation and Effects

Now, operation and effects of the canister structure according to the present exemplary embodiment are described.

In the present exemplary embodiment, when the fuel GS in the fuel tank 10 is being fed to the engine, the circuit board 58 of the fuel pump controller 46 is driven and generates heat. The heat generated by the circuit board 58 is conducted through the FPC case 56 to the dividing walls 42 and the dividing wall 48. As a result, the activated carbon 44 is heated, which may increase the kinetic energy of evaporated fuel that has been adsorbed by the activated carbon 44 and promote desorption of the evaporated fuel. That is, the desorption of the evaporated fuel may be promoted by utilizing heat produced from the fuel pump controller 46 for controlling flow rates of the fuel GS, without extra energy being required.

In the present exemplary embodiment, the FPC case 56, the dividing walls 42 and the dividing wall 48 are formed of materials that feature thermal conductivity, in addition to which the FPC case 56 is in contact with portions of the dividing walls 42 and the dividing wall 48. Therefore, the heat generated by the circuit board 58 of the fuel pump controller 46 may be conducted to the activated carbon 44 efficiently. Desorption performance in desorbing the evaporated fuel from the activated carbon 44 rises in association with a rise in temperature of the activated carbon 44. Therefore, because the activated carbon 44 is heated efficiently by the heat from the circuit board 58, desorption performance in desorbing the evaporated fuel may be improved.

Because the evaporated fuel desorption performance is improved as described above, a negative pressure that is caused to act on the canister 28 from the engine when evaporated fuel is to be desorbed may be reduced. Therefore, pumping losses may be reduced and fuel efficiency may be improved. In particular, fuel efficiency may be improved when the canister structure of the present invention is employed in a vehicle that obtains running driving power from an engine and from an electric motor for running, such as a hybrid vehicle (HV), a plug-in hybrid vehicle (PHV) or the like. That is, in an HV, a PHV or the like, fuel efficiency may be improved by lengthening stop durations of the engine. In this case, because the canister structure of the present invention is employed and the desorption performance is improved, a driving duration of the engine that is required for desorbing evaporated fuel may be shortened. Thus, fuel efficiency may be improved.

Further, in the present exemplary embodiment, because the upper lid 40 structuring the canister 28 is formed of a material featuring thermal conductivity, adsorption performance when evaporated fuel is being adsorbed by the activated carbon 44 may be excellently maintained. That is, when filling is being carried out while the engine is stopped or the like, evaporated fuel in the fuel tank 10 flows through the vent piping 26 and is introduced into the canister 28. Here, the evaporated fuel is adsorbed by the activated carbon 44, which heats the activated carbon 44. At this time, because the upper lid 40 is formed of the material featuring thermal conductivity, heat inside the canister case 36 is emitted to the outside through the upper lid 40, via the dividing walls 42 and the dividing wall 48. Therefore, a rise in temperature of the activated carbon 44 while the engine is stopped or the like may be moderated. Evaporated fuel adsorption performance rises in association with a fall in temperature of the activated carbon 44. Therefore, because a temperature rise of the activated carbon 44 may be moderated by heat in the canister case 36 being released, the evaporated fuel adsorption performance may be excellently maintained. Moreover, discharges of evaporated fuel into the atmosphere may be suppressed even though the size of the canister 28 may be reduced and space may be saved.

In the present exemplary embodiment, because the fuel pump controller 46 is disposed in the vicinity of the atmosphere vent tube 30, discharges of evaporated fuel into the atmosphere may be suppressed compared to a structure in which the fuel pump controller 46 is disposed at an alternative location. That is, when the circuit board 58 is driven, the temperature of the activated carbon 44 that is in the vicinity of the atmosphere vent tube 30 rises. Therefore, evaporated fuel that has been adsorbed by the activated carbon 44 that is in the vicinity of the atmosphere vent tube 30 is desorbed more easily. Hence, flows of evaporated fuel in the atmosphere vent tube 30 may be suppressed and discharges of evaporated fuel into the atmosphere may be suppressed.

In the present exemplary embodiment, because the fuel pump controller 46 is disposed inside the canister case 36, there is no need to reserve space for fixing the fuel pump controller 46 to the vehicle body, and space may be saved.

In addition, a bracket or the like for fixing the fuel pump controller 46 to the vehicle body is not needed.

In the present exemplary embodiment, when evaporated fuel is desorbed from the activated carbon 44, the temperature of the activated carbon 44 falls due to the latent heat of vaporization. Thus, the fuel pump controller 46 may be cooled and the temperature of the fuel pump controller 46 may be kept in a suitable temperature range.

Second Exemplary Embodiment

Figure 5:
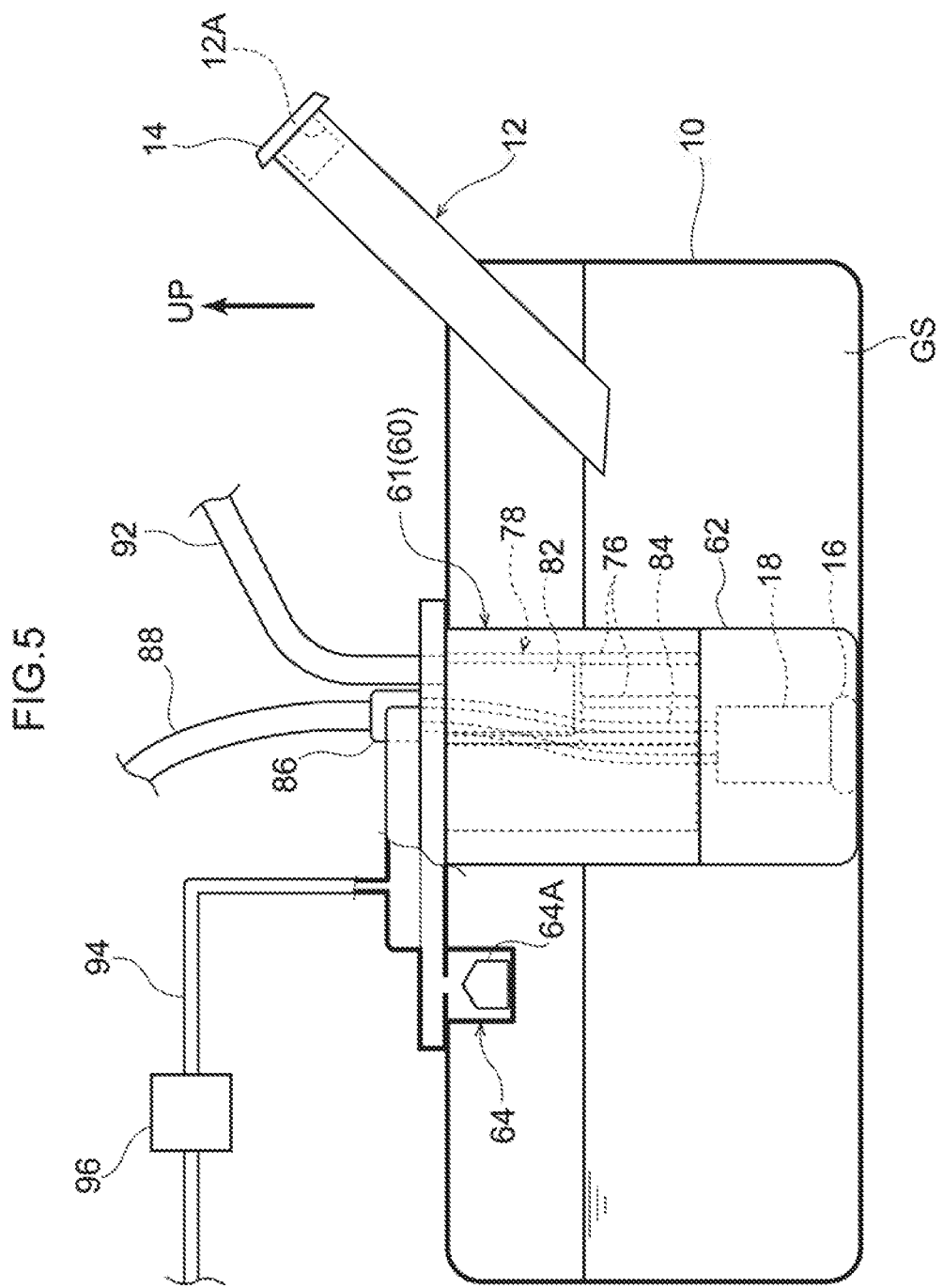
FIG. 5 is a partially cutaway schematic diagram schematically showing structures of a fuel tank in which a canister structure in accordance with a second exemplary embodiment is employed.
Figure 6:
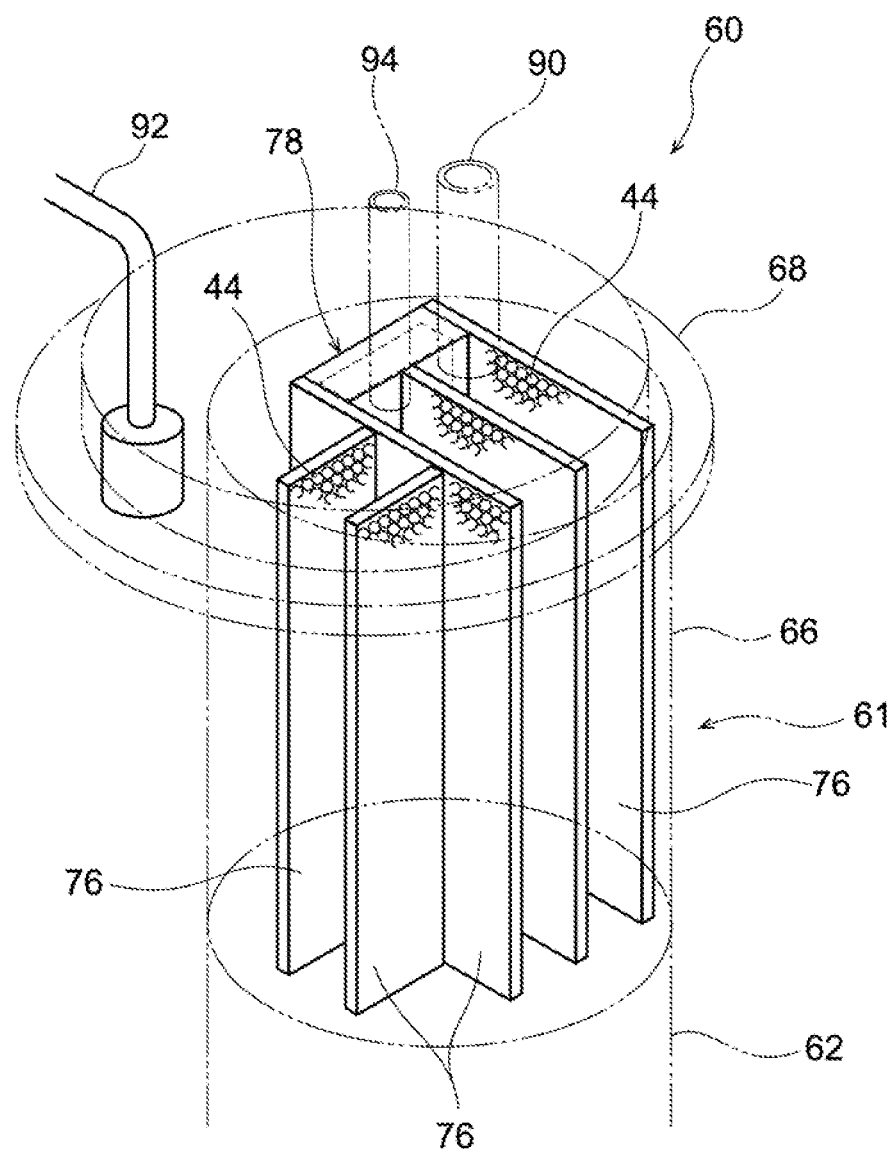
FIG. 6 is a magnified perspective diagram in which principal portions of the canister structure in accordance with the second exemplary embodiment are shown magnified.
Figure 7:
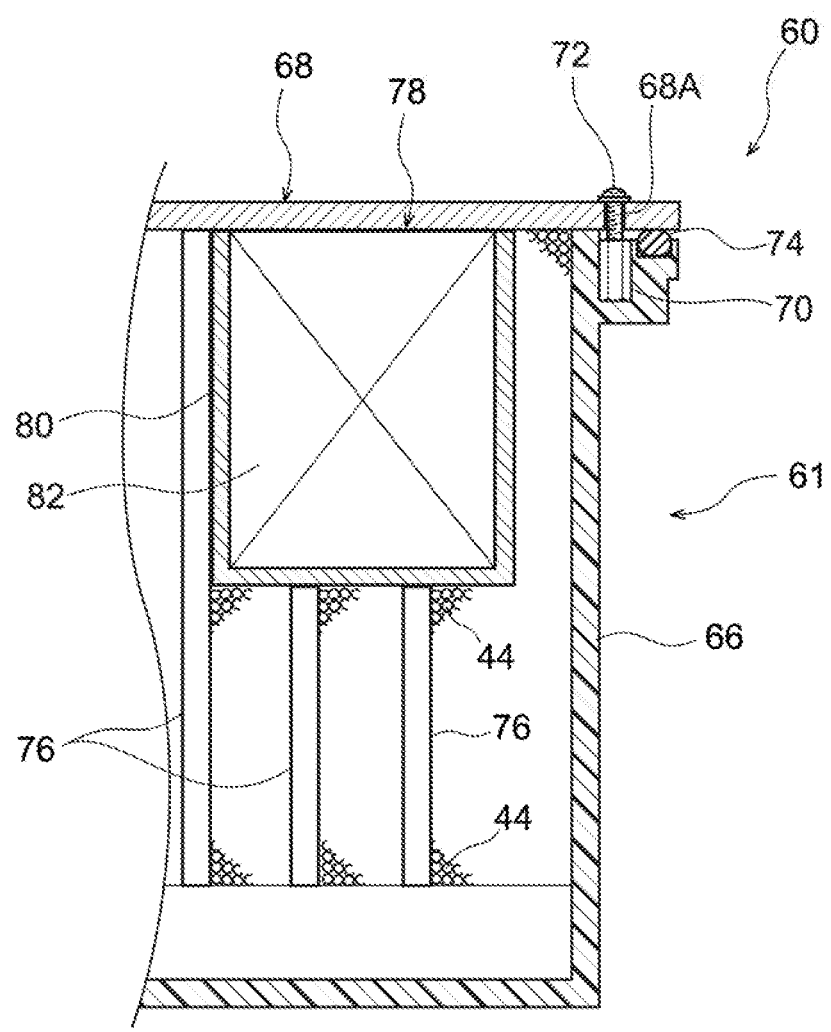
FIG. 7 is a magnified sectional diagram in which the surroundings of a fuel pump controller in accordance with the second exemplary embodiment are shown magnified.

Now, a canister structure according to a second exemplary embodiment is described in accordance with FIG. 5 to FIG. 7. Structures that are the same as in the first exemplary embodiment are assigned the same reference symbols and, as appropriate, are not described.

As shown in FIG. 5, a canister 60 that structures the canister structure according to the present exemplary embodiment is disposed inside the fuel tank 10. A pump module 62 is provided at the floor portion of the fuel tank 10. The filter 16 and the fuel pump 18 are provided inside the pump module 62, and the canister 60 is provided above the pump module 62.

As shown in FIG. 6, the canister 60 is provided with a canister case 61 that structures an outer shell thereof. The canister case 61 is provided with a substantially circular tube-shaped case main body 66, an upper end portion of which is open. In order to reduce weight, this case main body is formed of a resin. An upper lid 68 is attached to an upper end portion of the case main body 66. The upper lid 68 is formed of a material that features thermal conductivity. For example, the upper lid 68 is formed of aluminium or an aluminium alloy.

As shown in FIG. 7, bolt holes 68A are formed in outer periphery portions of the upper lid 68. Correspondingly, insert nuts 70 are provided at the upper end portion of the case main body 66, at locations that correspond with the bolt holes 68A. Bolts 72 are inserted into the bolt holes 68A and screwed into the insert nuts 70. Thus, the upper lid 68 is fastened to the case main body 66. A sealing member 74 is provided between the upper lid 68 and the case main body 66. Gaps between the upper lid 68 and the case main body 66 are sealed up by the sealing member 74.

Plural dividing walls 76, the activated carbon 44, and a fuel pump controller 78 are accommodated in the interior of the canister case 61. As shown in FIG. 6, the dividing walls 76 are arranged along the axial direction (the up-and-down direction) of the canister 60. In the present exemplary embodiment, five of the dividing walls 76 are arranged. Of the five dividing walls 76, three of the dividing walls 76 are arranged substantially in parallel and spaced apart, and the other two of the dividing walls 76 are arranged in a direction that is orthogonal to the three dividing walls 76 as viewed from the side at which the upper lid 68 is disposed. Note that numbers and arrangements of the dividing walls 76 are not particularly limited.

The activated carbon 44 is packed in between neighboring the dividing walls 76. The fuel pump controller 78 is disposed at an upper end portion of the canister case 61. The fuel pump controller 78 includes an FPC case 80, an upper end portion of which is open, and a circuit board 82 accommodated in the FPC case 80. The FPC case 80 is attached to the upper lid 68.

The FPC case 80 is formed of a material featuring thermal conductivity. For example, the FPC case 80 is formed of aluminium or an aluminium alloy. The FPC case 80 is in contact with portions of the dividing walls 76.

As shown in FIG. 5, the fuel pump 18 is connected with the circuit board 82 of the fuel pump controller 78 by an electrical cord 84. A connector 86 is mounted at the upper lid 68, and a wire harness 88 is connected to the connector 86. Thus, the fuel pump controller 78 and the fuel pump 18 are electrically connected with an ECU, which is not shown in the drawings.

A float valve 64 that is similar to the float valve 24 according to the first exemplary embodiment is provided at an upper end portion of the interior of the fuel pump 18. The float valve 64 is provided with a float valve body 64A. As shown in FIG. 6, vent piping 90, an atmosphere vent tube 92 and purge piping 94 are connected to the canister 60. The vent piping 90 is piping for introducing evaporated fuel in the fuel tank 10 into the canister 60. The atmosphere vent tube 92 is piping for venting air components from which the evaporated fuel has been removed. The purge piping 94 is piping for feeding evaporated fuel that has been desorbed from the activated carbon 44 to the engine. As shown in FIG. 5, a purge control valve 96 is provided on the purge piping 94.

Operation and Effects

Now, operation and effects of the canister structure according to the present exemplary embodiment are described.

In the present exemplary embodiment, the canister 60 is disposed inside the fuel tank 10. Therefore, there is no need to reserve space for fixing the canister 60 to the vehicle body, and space may be saved. In addition, a bracket or the like for fixing the canister 60 to the vehicle body is not needed.

Compared to the first exemplary embodiment, a distance between the fuel pump controller 78 and the fuel pump 18 is shorter. Therefore, wiring may be shortened and wiring may be shared. Other operations are the same as in the first exemplary embodiment.

Third Exemplary Embodiment

Figure 8:
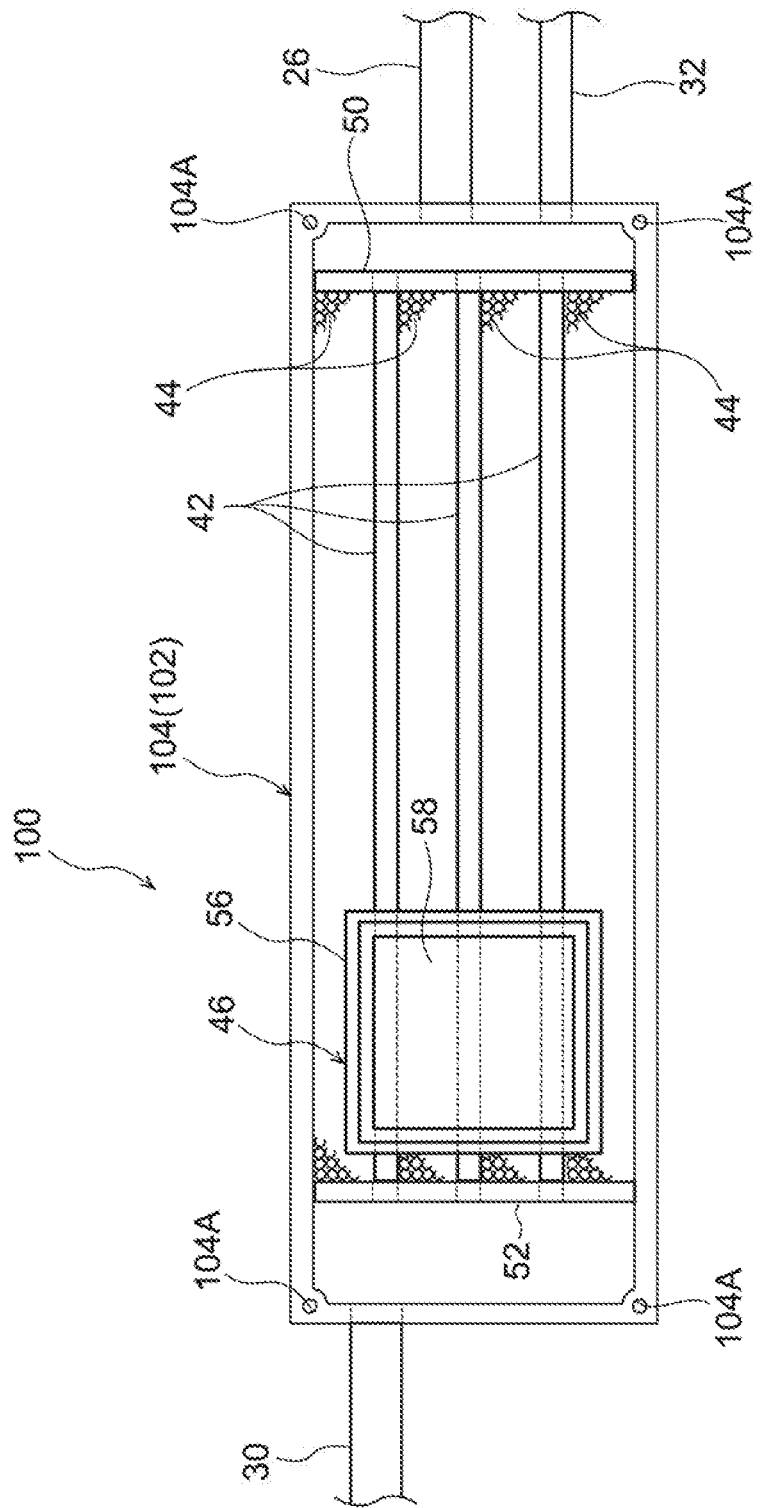
FIG. 8 is a magnified plan view, corresponding to FIG. 3, in which principal portions of a canister structure in accordance with a third exemplary embodiment are shown magnified.

Now, a canister structure according to a third exemplary embodiment is described in accordance with FIG. 8. Structures that are the same as in the first exemplary embodiment are assigned the same reference symbols and, as appropriate, are not described.

As shown in FIG. 8, a canister 100 that structures the canister structure according to the present exemplary embodiment is provided with a canister case 102. The canister case 102 includes a case main body 104 and an upper lid that is not shown in the drawings.

The case main body 104 is formed in a substantially rectangular shape in plan view. The vent piping 26 and the purge piping 32 are connected to one side of the long dimension direction of the case main body 104. The atmosphere vent tube 30 is connected to the other side of the long dimension direction of the case main body 104. Thus, the canister structure according to the present exemplary embodiment is structured by the single-stream format canister 100, in which the evaporated fuel flows through the case main body 104 in one direction, rather than a multiple-stream format canister in which the evaporated fuel turns back within the canister, as in the first exemplary embodiment.

Three of the dividing walls 42 are disposed, spaced apart, in the interior of the case main body 104. These dividing walls 42 span between the support plate 50 and the support plate 52. The fuel pump controller 46 is disposed inside the case main body 104, in a vicinity of the atmosphere vent tube 30. The canister structure that is provided with the canister 100 with the single-stream side as described above has similar operational effects to the first exemplary embodiment.

Fourth Exemplary Embodiment

Figure 9:
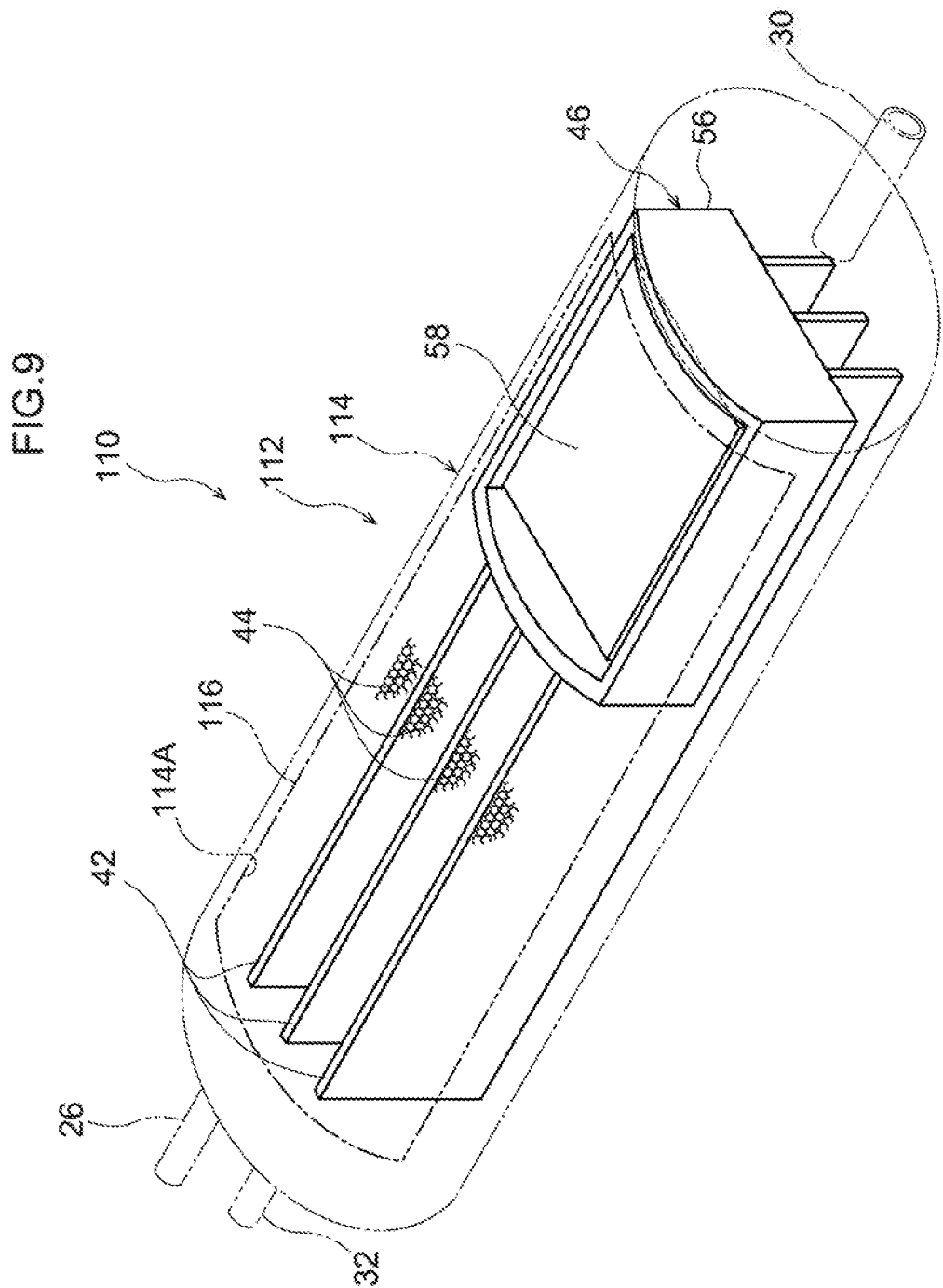
FIG. 9 is a magnified perspective diagram, corresponding to FIG. 2, in which principal portions of a canister structure in accordance with a fourth exemplary embodiment are shown magnified.

Now, a canister structure according to a fourth exemplary embodiment is described in accordance with FIG. 9. Structures that are the same as in the first exemplary embodiment are assigned the same reference symbols and, as appropriate, are not described.

As shown in FIG. 9, a canister 110 that structures the canister structure according to the present exemplary embodiment is provided with a canister case 112. The canister case 112 includes a case main body 114 and an upper lid 116.

The case main body 114 is formed in a substantially circular tube shape. The vent piping 26 and the purge piping 32 are connected to one side of the length direction of the case main body 114. The atmosphere vent tube 30 is connected to the other side of the length direction of the case main body 114.

An aperture 114A is formed in the case main body 114. The upper lid 116 is attached so as to close off the aperture 114A. In this exemplary embodiment, the upper lid 116 is formed of a material featuring thermal conductivity, being formed of, for example, aluminium or an aluminium alloy.

Three of the dividing walls 42 are disposed, spaced apart, inside the case main body 114. The fuel pump controller 46 is disposed inside the case main body 114, in a vicinity of the atmosphere vent tube 30. The fuel pump controller 46 includes the FPC case 56 and the circuit board 58. The FPC case 56 according to the present exemplary embodiment is formed in a shape that corresponds with the shape of the canister case 112. The structure in which the canister case 112 is formed in the substantially circular tube shape as described above has similar operational effects to the first exemplary embodiment.

Fifth Exemplary Embodiment

Figure 10:
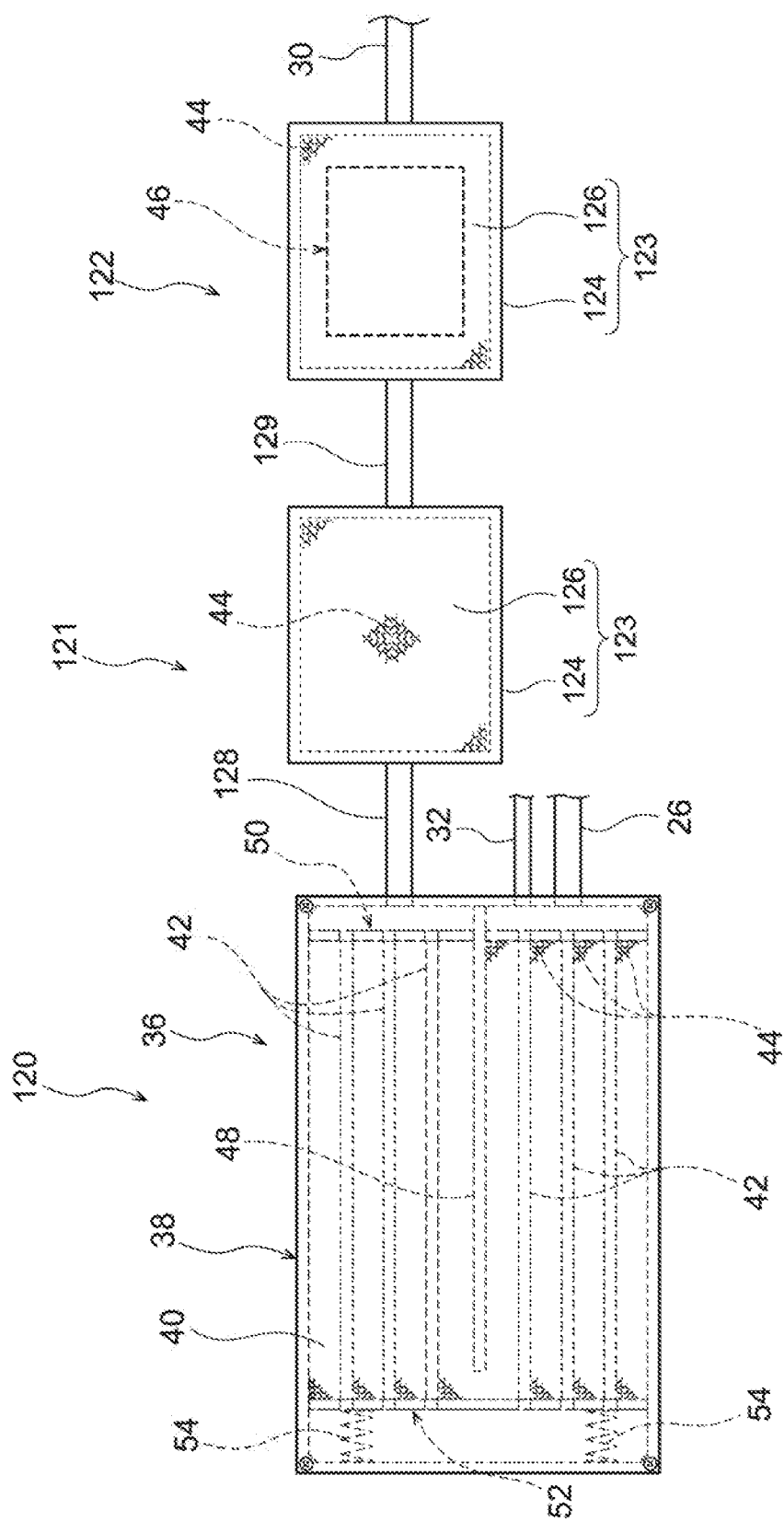
FIG. 10 is a magnified plan view, corresponding to FIG. 3, in which principal portions of a canister structure in accordance with a fifth exemplary embodiment are shown magnified.

Now, a canister structure according to a fifth exemplary embodiment is described in accordance with FIG. 10. Structures that are the same as in the first exemplary embodiment are assigned the same reference symbols and, as appropriate, are not described.

As shown in FIG. 10, the canister structure according to the present exemplary embodiment includes a canister 120, a canister 121 and a canister 122. The canister 120 has substantially the same structure as the canister 28 according to the first exemplary embodiment, except that the fuel pump controller 46 is not accommodated therein. Instead of the atmosphere vent tube 30, a first connecting tube 128 is connected to the canister 120. The canister 120 is connected to the canister 121 via the first connecting tube 128.

The canister 121 is provided with a canister case 123 with a substantially rectangular shape in plan view. The canister case 123 includes a case main body 124 and an upper lid 126. The activated carbon 44 is packed into the interior of the case main body 124.

A second connecting tube 129 is connected to the case main body 124 of the canister 121. The case main body 124 is connected to the canister 122 via the second connecting tube 129. Similarly to the canister 121, the canister 122 is provided with another of the canister case 123. The fuel pump controller 46 is accommodated inside this canister case 123. The atmosphere vent tube 30 is connected to the case main body 124 of the canister case 123.

As described above, in the canister structure according to the present exemplary embodiment, a flow path of evaporated fuel is made longer than in the first exemplary embodiment by the plural canisters 120, 121 and 122 being connected in series. As a result, discharges of evaporated fuel into the atmosphere may be suppressed. In particular, because the fuel pump controller 46 is accommodated inside the canister 122 to which the atmosphere vent tube 30 is connected, desorption of evaporated fuel from the activated carbon 44 in the canister 122 may be promoted, and flows of the evaporated fuel into the atmosphere vent tube 30 may be suppressed. Other operations are the same as in the first exemplary embodiment.

Sixth Exemplary Embodiment

Now, a canister structure according to a sixth exemplary embodiment is described in accordance with FIG. 11. Structures that are the same as in the first exemplary embodiment are assigned the same reference symbols and, as appropriate, are not described.

As shown in FIG. 11, the canister structure according to the present exemplary embodiment includes a canister 132 and six canisters 130 (130A to 130F). Each of the six canisters 130 is provided with the canister case 123. The canister case 123 includes the case main body 124 and the upper lid 126. The activated carbon 44 is packed into each of the canister cases 123.

In this exemplary embodiment, the six canisters 130 are disposed on a substantially circular arc-shaped line; neighboring the canisters 130 are connected in series by connecting tubes 134. The vent piping 26 and the purge piping 32 are connected to the canister 130A, which is at one end side. At the other end side, the canister 132 is connected to the canister 130F via another of the connecting tubes 134.

Similarly to the canisters 130, the canister 132 is provided with the canister case 123, and this canister case 123 includes the case main body 124 and the upper lid 126. The fuel pump controller 46 is accommodated inside this canister case 123. The activated carbon 44 is packed into the surroundings of the fuel pump controller 46, and the atmosphere vent tube 30 is connected to the case main body 124 of this canister case 123. The plural canisters 130A, 130B, 130C, 130D, 130E, 130F, and 132 are connected in series.

As described above, in the canister structure according to the present exemplary embodiment, the plural canisters 130 and 132 are connected. Thus, discharges of evaporated fuel into the atmosphere may be suppressed compared to the first exemplary embodiment. In particular, because the fuel pump controller 46 is accommodated inside the canister 132 to which the atmosphere vent tube 30 is connected, desorption of evaporated fuel from the activated carbon 44 in the canister 132 may be promoted, and flows of evaporated fuel into the atmosphere vent tube 30 may be suppressed. Other operations are the same as in the first exemplary embodiment.

The first to sixth exemplary embodiments of the present invention are described hereabove but the present invention is not limited by the structures described above and it will be clear that the present invention may be embodied in numerous modes beside the above structures within a scope that does not depart from the gist of the present invention. For example, in the exemplary embodiments described above, the upper lid of each aluminium case is formed of aluminium or an aluminium alloy, but this is not limiting. The upper lid may be formed of an alternative metal, a thermally conductive resin of the like. The case main body of each canister case may also be formed of a material featuring thermal conductivity.

The first to fourth exemplary embodiments are provided with dividing walls that are formed of a material featuring thermal conductivity and the activated carbon 44 is packed in between these dividing walls, but this is not limiting. For example, structures are possible in which the activated carbon 44 is packed into the surroundings of a fuel pump controller without dividing walls being provided. Conversely, in the fifth exemplary embodiment and the sixth exemplary embodiment, no dividing wall is provided in the canister in which the fuel pump controller 46 is accommodated, but this is not limiting; dividing walls may be arranged therein.

In the exemplary embodiments described above, the fuel pump controller is disposed in the vicinity of the atmosphere vent tube, but this is not limiting. The fuel pump controller may be disposed in an alternative location. For example, the fuel pump controller 46 may be disposed in a central region of the canister case 36 in FIG. 3, as viewed from above in the case up-and-down direction. In this case, heat may be transmitted to the surrounding activated carbon 44 uniformly.

In the exemplary embodiments described above, the upper lid of each canister case is formed as a separate body from the dividing walls, but this is not limiting. For example, the upper lid and the dividing walls may be formed integrally.

What is claimed is:

1. A canister structure comprising:
   a canister in which activated carbon is accommodated, the activated carbon being for adsorbing evaporated fuel produced in a fuel tank;
   an atmosphere vent tube connected to the canister, the atmosphere vent tube introducing air into the canister and causing evaporated fuel adsorbed by the activated carbon to be desorbed when a negative pressure acts in the canister; and
   a fuel pump controller disposed in the canister, the fuel pump controller controlling flow rates of fuel being supplied from the fuel tank to an engine, and the fuel pump controller generating heat due to being operated.

2. The canister structure according to claim 1, wherein dividing walls having thermal conductivity are plurally arranged in the canister, and the activated carbon is packed in between neighboring dividing walls.

3. The canister structure according to claim 2, wherein the fuel pump controller comprises a circuit board and an accommodation portion, the accommodation portion accommodating the circuit board and having thermal conductivity, and wherein the accommodation portion is in contact with at least a portion of the dividing walls.

4. The canister structure according to claim 1, wherein at least a portion of a canister case that structures an outer shell of the canister is formed of a material having thermal conductivity.

5. The canister structure according to claim 4, wherein the canister case includes a case main body and an upper lid, and the upper lid is formed of the material having thermal conductivity.

6. The canister structure according to claim 1, wherein the fuel pump controller is disposed in a vicinity of the atmosphere vent tube.

7. The canister structure according to claim 1, wherein the canister is disposed in the fuel tank.

8. The canister structure according to claim 1, wherein a plurality of canisters are connected in series by a connecting tube, and the fuel pump controller is accommodated inside a canister among the plurality of canisters, to which canister the atmosphere vent tube is directly connected.

* * * * *